United States Patent
Johns (10) Patent No.: US 9,231,975 B2
(45) Date of Patent: Jan. 5, 2016

(54) SAFE SCRIPT TEMPLATING TO PROVIDE RELIABLE PROTECTION AGAINST ATTACKS

(71) Applicant: Martin Johns, Karlsruhe (DE)

(72) Inventor: Martin Johns, Karlsruhe (DE)

(73) Assignee: SAP SE, Walldorf (DE)

( * ) Notice: Subject to any disclaimer, the term of this patent is extended or adjusted under 35 U.S.C. 154(b) by 26 days.

(21) Appl. No.: 13/928,872

(22) Filed: Jun. 27, 2013

(65) Prior Publication Data
US 2015/0007251 A1 Jan. 1, 2015

(51) Int. Cl.
*H04L 29/06* (2006.01)
*G06F 21/52* (2013.01)

(52) U.S. Cl.
CPC ............. *H04L 63/20* (2013.01); *G06F 21/52* (2013.01); *H04L 63/1466* (2013.01); *H04L 63/168* (2013.01)

(58) Field of Classification Search
CPC ..... G06F 21/10; G06F 17/2247; G06F 21/54; H04L 63/0428; H04L 63/107; H04L 67/02
USPC .......................................................... 726/22
See application file for complete search history.

(56) References Cited

U.S. PATENT DOCUMENTS

| | | | | |
|---|---|---|---|---|
| 5,694,471 | A * | 12/1997 | Chen et al. .......... | 705/76 |
| 8,677,481 | B1 * | 3/2014 | Lee ..................... | 726/22 |
| 2005/0172331 | A1 * | 8/2005 | Blackketter et al. ........ | 725/135 |
| 2007/0269041 | A1 * | 11/2007 | Bhatnagar et al. ........... | 380/30 |
| 2010/0228737 | A1 * | 9/2010 | Riemers .................... | 707/747 |
| 2011/0296179 | A1 * | 12/2011 | Templin et al. ........... | 713/168 |
| 2012/0090026 | A1 * | 4/2012 | Andrews et al. .............. | 726/22 |
| 2013/0095864 | A1 * | 4/2013 | Marovets .................... | 455/466 |

OTHER PUBLICATIONS

Barth et al., "Content Security Policy 1.1.", W3C Working Draft, Jun. 4 2013.*
Takesue, Masaru. "A protection scheme against the attacks deployed by hiding the violation of the same origin policy." Emerging Security Information, Systems and Technologies, 2008. Securware'08. Second International Conference on. IEEE, 2008.*
Mountie et al., "Content Security Policy 1.1.", Script-nonce or script-hash, Jun. 19, 2013 Ruderman, Jesse "JavaScript Security: Signed Scripts", Apr. 21, 2008.*
Ruderman, Jesse "JavaScript Security: Signed Scripts", Apr. 21, 2008.*

(Continued)

*Primary Examiner* — Syed Zaidi
(74) *Attorney, Agent, or Firm* — Fish & Richardson P.C.

(57) ABSTRACT

Methods, systems, and computer-readable storage media for inhibiting cross-site scripting (XSS) attacks, where actions include receiving a computer-readable document that provides a content security policy (CSP) for a website and an extension to the CSP, the CSP specifying allowed script checksums, each allowed script checksum being associated with a script that is allowed to be executed, the extension requiring comparison of script checksums before respective scripts can be executed, receiving script templates and a value list, calculating an expected script checksum for each script template to provide respective expected script checksums, comparing the expected script checksums to the allowed script checksums, and determining that at least one expected script checksum matches an allowed script checksum, and in response, executing a respective script that corresponds to the at least one expected script checksum.

16 Claims, 3 Drawing Sheets

(56) References Cited

OTHER PUBLICATIONS

Bates, et al., Regular Expressions Considered Harmful in Client-Side XSS Filters, International World Wide Web Conference Committee, WWW 2010, Apr. 2010, 9 pages.
D. Crockford, The application/json Media Type for JavaScript Object Notation (JSON), RFC 4627, [retrieved online: http://www.ietf.org/rfc/rfc4627.txt], Jul. 2006, 10 pages.
Mario Heiderich, et al., IceShield: Detection and Mitigation of Malicious Websites with a Frozen DOM, Chair for Network and Data Security, Ruhr-University Bochum, 2011, 20 pages.
Trevor Jim, et al., Defeating Script Injection Attacks with Browser-Enforced Embedded Policies, International World Wide Web Conference Committee, WWW 2007, May 2007, 10 pages.
Amit Klein, DOM Based Cross Site Scripting or XSS of the Third Kind. [retrieved online: http://www.webappsec.org/projects/articles/071105.shtml], Jul. 4, 2005, 8 pages.
Benjamin Livshits, et al., Spectator: Detection and Containment of JavaScript Worms, Microsoft Research, In Usenix Annual Technical Conference, Jun. 2008, 14 pages.
Mike Ter Louw, et al., BluePrint: Robust Prevention of Cross-site Scripting Attacks for Existing Browsers, 30th IEEE Symposium on Security and Privacy, May 2009, 16 pages.
Giorgio Maone, NoScript Firefox Extension, [software], [retrieved Oct. 2, 2013 online: http://www.noscript], 5 pages.
Yacin Nadji, et al., Document Structure Integrity: A Robust Basis for Cross-site Scripting Defense, In NDSS 2009, 2009, 20 pages.
A. Nguyen-Tuong, et al., Automatically Hardening Web Applications Using Precise Tainting, 20th IFIP International Information Security Conference, May 2005, 25 pages.
Nick Nikiforakis, et al., SessionShield: Lightweight Protection against Session Hijacking, IBBT-DistriNet, SAP Research, 14 pages.
Nick Nikiforakis, et al., You Are What You Include: Large-scale Evaluation of Remote JavaScript Inclusions, CCS 2012, Oct. 2012, 12 pages.
Phu H. Phung, et al., Lightweight Self-Protecting Javascript, In Proceedings of ACM Symposium on Information, Computer and Communications Security (ASIACCS 2009), Mar. 2009, 14 pages.
Tadeusz Pietraszek et al., Defending against Injection Attacks through Context-Sensitive String Evaluation., In Proceedings of Recent Advances in Intrusion Detection (RAID2005), 2005, 26 pages.
W. Robertson, et al., Static Enforcement of Web Application Integrity Through Strong Typing, In Proceedings of the USENIX Security Symposium, Mon-treal, Canada, Aug. 2009, 15 pages.
David Ross, IE 8 XSS Filter Architecture / Implementation, [retrieved online: http://blogs.technet.com/b/srd/archive/2008/08/19/ie-8-xss-filter-architecture-implementation.aspx ], Aug. 2008.
Jesse Ruderman, The Same Origin Policy. [retrieved online: http://www.mozilla.org/projects/security/components/same-origin.html ], Aug. 24 2001, 2 pages.
Theodoor Scholte, et al., Have things changed now? An Empirical Study on Input Validation Vulnerabilities in Web Applications, Computers & Security, vol. 3, Issue 3, 2012, pp. 344-356.
Sid Stamm, et al., Reining in the Web with Content Security Policy. WWW 2010, Apr. 2010, 9 pages.
Brandon Sterne, et al., W3C, Content Security Policy, W3C Working Draft Nov. 29, 2011 [retrieved online: http://www.w3.org/TR/2011/WD-CSP-20111129/], Nov. 2010, 9 pages.
Brandon Sterne, et al., W3C, Content Security Policy 1.0, W3C Candidate Recommendation Nov. 15, 2012 [retrieved online: http://www.w3.org/TR/CSP/], Nov. 2012, 15 pages.
Adam Barth, et al., W3C, Content Security Policy 1.1, W3C Working Draft Dec. 13, 2012 [retrieve online: http://www.w3.org/TR/2012/WD-CSP11-20121213/], Dec. 2012, 18 pages.
The Web Security Mailing List, The Cross Site Scripting (XSS) FAQ, [retrieved online: http://www.cgisecurity.com/articles/xss-faq.shtml , May 2002, 12 pages.
Ben Toews, Abusing Password Managers with XSS, [retrieved online: http://labs.neohapsis.com/2012/04/25/abusing-password-managers-with-xss/], Apr. 2012, 8 pages.
Philipp Vogt, et al., Cross Site Scripting Prevention with Dynamic Data Tainting and Static Analysis, In NDSS 2007, 2007, 12 pages.
Michal Zalewski, Postcards from the post-XSS world. [retrieved Oct. 2, 2013 online: http://lcamtuf.coredump.cx/postxss/], Dec. 2011, 8 pages.
Steven Van Acker, et al., WebJail: Least-privilege Integration of Third-party Components in Web Mashups, In Proceedings of the ACSAC 2011 Conference, Dec. 2011, pp. 307-316.
Prithvi Bisht, et al., XSS-Guard: Precise Dynamic Prevention of Cross-Site Scripting Attacks, In DIMVA, 2008, 20 pages.
CERT Software Engineering Institute, CERT® Advisory CA-2000-02 Malicious HTML Tags Embedded in Client Web Requests, [retrieved online: http://www.cert.org/advisories/CA-2000-02.html], Feb. 2000, 5 pages.
Mario Heiderich, et al., Scriptless Attacks—Stealing the Pie Without Touching the Sill, In ACM Conference on Computer and Communications Security, Oct. 2012, 12 pages.
Martin Johns, Code Injection Vulnerabilities in Web Applications—Exemplified at Cross-site Scripting, University of Passau, 2009, 252 pages.
Martin Johns, et al., Secure Code Generation for Web Applications, In 2nd International Symposium on Engineering Secure Software and Systems (ESSoS 2010). Springer-Verlag Berlin Heidelberg, 2010, pp. 96-113.
Leo A. Meyerovich, et al., Conscript: Specifying and Enforcing Fine-Grained Security Policies for Javascript in the Browser, IEEE Symposium on Security and Privacy, IEEE Computer Society, 2010, pp. 481-496.
Open Web Application Project (OWASP), OWASP Top 10—2010 The Top Ten Most Critical Web Application Security Risks, [retrieved online: http://www.owasp.org/index.php/Category:OWASP_Top_Ten_Project], 2010, 22 pages.
Open Web Application Project (OWASP), XSS (Cross Site Scripting) Prevention Cheat Sheet, [retrieved Oct. 3, 2013 online: https://www.owasp.org/index.php/XSS_(Cross_Site_Scripting)_Prevention_Cheat_Sheet], 8 pages.
Martin Johns, PreparedJS: Secure Script-Templates for JavaScript, SAP Research, 2013, 27 pages.

* cited by examiner

SAFE SCRIPT TEMPLATING TO PROVIDE RELIABLE PROTECTION AGAINST ATTACKS

BACKGROUND

Content Security Policies (CSP) provide powerful means to mitigate cross-site scripting (XSS) exploits. However, the protection provided by CSP is incomplete. For example, insecure server-side script, e.g., Javascript, generation and attacker control over script sources can lead to XSS conditions that cannot be mitigated by CSP.

SUMMARY

Implementations of the present disclosure include computer-implemented methods for inhibiting cross-site scripting (XSS) attacks. In some implementations, actions include receiving a computer-readable document, the computer-readable document providing a content security policy (CSP) for a website and an extension to the CSP, the CSP specifying one or more allowed script checksums, each allowed script checksum being associated with a script that is allowed to be executed, the extension requiring comparison of script checksums before respective scripts can be executed, receiving one or more script templates and a value list, calculating an expected script checksum for each script template of the one or more script templates to provide respective one or more expected script checksums, comparing the one or more expected script checksums to the one or more allowed script checksums, and determining that at least one expected script checksum matches an allowed script checksum of the one or more allowed script checksums, and in response, executing a respective script that corresponds to the at least one expected script checksum.

In some implementations, executing the respective script includes populating the respective script with one or more data values provided in the value list.

In some implementations, the value list maps one or more data values to one or more respective placeholders within the one or more script templates.

In some implementations, at least one script template includes script syntax and one or more placeholders to separate data values from the script syntax.

In some implementations, actions further include determining that each script template of the one or more script templates is associated with a respective host that is whitelisted in the CSP.

In some implementations, calculating the expected script checksum occurs in response to determining that each script template of the one or more script templates is associated with a respective host that is whitelisted in the CSP.

In some implementations, actions further include determining that a particular expected script checksum does not match an allowed script checksum of the one or more allowed script checksums, and in response, prohibiting execution of a respective script that corresponds to the particular expected script checksum.

In some implementations, each expected script checksum is calculated as a cryptographic hash.

In some implementations, each expected script checksum is calculated as a cryptographic hash calculated over a respective script template.

In some implementations, processing, comparing and determining are executed on a client-side.

In some implementations, the one or more script templates and the value list are provided in a hypertext transfer protocol (HTTP) response to the client-side from a server-side.

In some implementations, processing, comparing and determining are executed by a web browser that is executed on the client-side.

In some implementations, processing, comparing and determining are executed on a server-side.

In some implementations, executing is performed on a client-side.

In some implementations, the computer-readable document is an HTML document.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to an extension, referenced herein as PreparedScript, to content security policy (CSP), which takes weaknesses of CSP into account. More specifically, implementations of the PreparedScript provide a safe script templating mechanism in combination with a light-weight script check-summing scheme. In this manner, PreparedScript is able to fill identified gaps in the protection capabilities of CSP. As discussed in further detail herein, PreparedScript, in combination with the base-line protection provided by CSP, is able to inhibit a spectrum of potential XSS attacks. In some implementations, PreparedScript can be realized as a native Web browser component. In some implementations, backwards compatibility is provided for legacy Web browsers that cannot handle the script format of PreparedScript.

Figure 1:
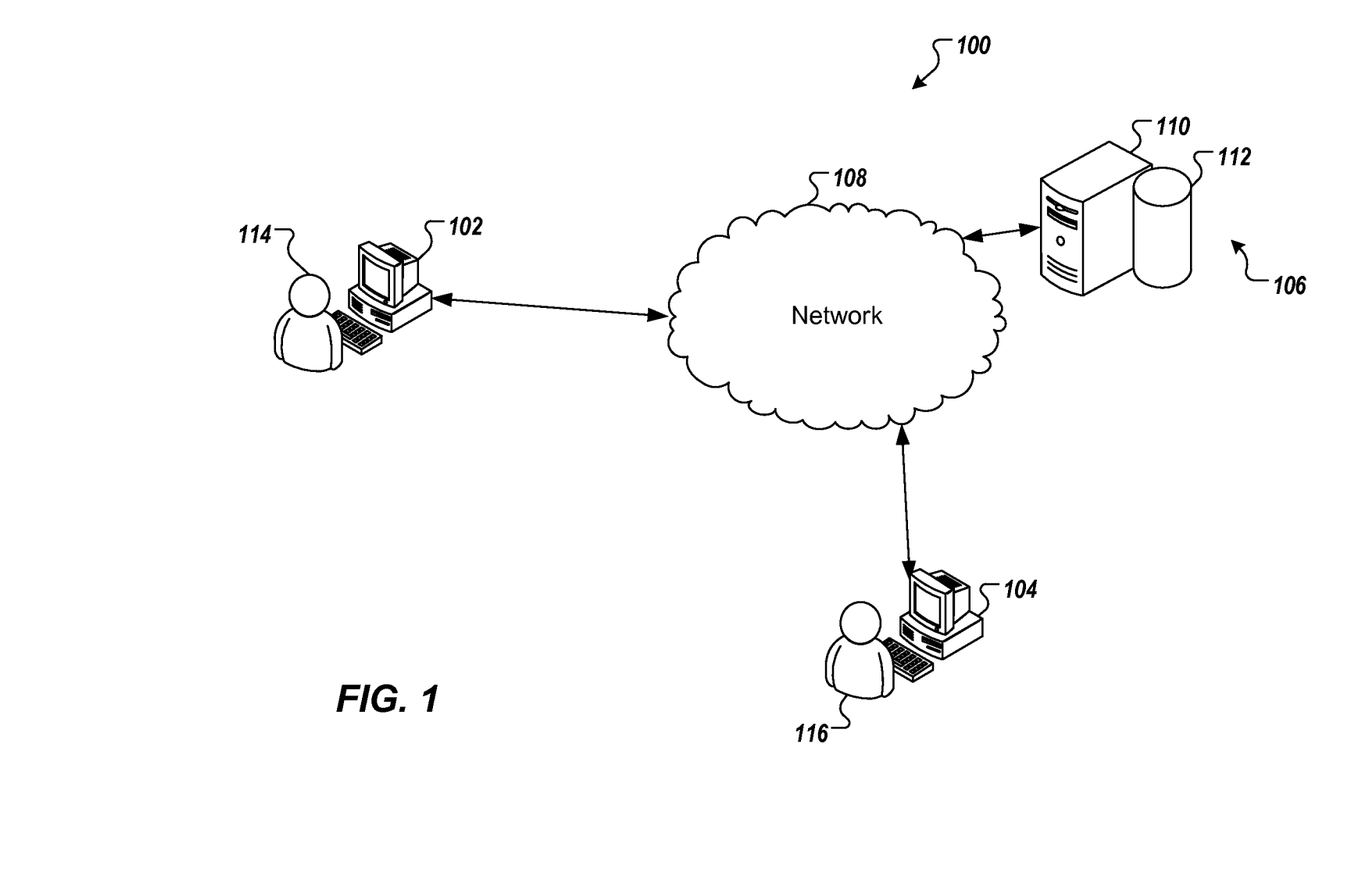
FIG. 1 depicts an example high-level architecture in accordance with implementations of the present disclosure.

FIG. 1 depicts an example system 100 that can execute implementations of the present disclosure. The example system 100 includes a first computing device 102, a second computing device 104, a server system 106 and a network 108. The first and second computing devices 102, 104 can each include any appropriate type of computing device such as a desktop computer, a laptop computer, a handheld computer, a tablet computing device, a personal digital assistant (PDA), a cellular telephone, a network appliance, a camera, a smart phone, an enhanced general packet radio service (EGPRS) mobile phone, a media player, a navigation device, an email device, a game console, or a combination of any two or more of these data processing devices or other data processing devices. In the example system 100 of FIG. 1, the computing devices are depicted as desktop computers.

The computing devices 102, 104 can communicate with one another and/or the server system 106 over the network 108. The network 108 can include a large computer network, such as a local area network (LAN), a wide area network (WAN), the Internet, a cellular network, or a combination thereof connecting any number of mobile computing devices, fixed computing devices and server systems. The server system 106 can include one or more computing devices 110 and one or more machine-readable repositories, or databases 112.

For purposes of illustration, and as discussed in further detail below, a user 114 can use the first computing device 102 to interact with one or more web pages of a web site that is hosted by the server system 106. In some examples, interaction between the first computing device 102 and the server system 106 includes executing a web browser on the first computing device 102 to display the one or more web pages. In some examples, the user 114 accesses a web application hosted on the server system 106 using the web browser. In some examples, the one or more web pages include interaction elements such as dialogue boxes and clickable buttons that enable the user 114 to provide input to the web application, and receive output from the web application.

A user 116 using the second computing device 104 can be a malicious user that seeks to exploit potential vulnerabilities of the interaction between the computing device 102 and the server system 106. As discussed in further detail herein, implementations of the present disclosure inhibit attacks that exploit vulnerabilities in web browser interactions.

Before discussing details of implementations of the present disclosure, cross-site scripting (XSS) and CSP used to inhibit XSS attacks will be briefly discussed. In this manner, a general context will be provided to assist in understanding the details and benefits of implementations of the present disclosure.

In general, XSS is one of the most prevalent security problems of the Worldwide Web ("web"). Although XSS has been a long-recognized attack vector, XSS still occurs frequently, even on high-profile websites and mature applications. One defense against XSS is secure coding on the server-side through careful and context-aware sanitization of attacker provided data. However, the apparent difficulties to master the problem on the server-side have led to investigations of client-side mitigation techniques.

A promising approach to client-side mitigation is CSP, which is currently under active development and has already been implemented by various web browsers. In general, CSP provides tools to mitigate many XSS exploits. However, in order to properly benefit from the protection capabilities provided by CSP, website operators are required to conduct significant changes with respect to how scripts, such as JavaScript, are used within web applications. This includes, for example, removing inline JavaScript, such as event handlers in hypertext mark-up language (HTML) attributes, and string-to-code transformations, e.g., provided by eval ( ) and similar functions. Unfortunately, and as discussed in further detail herein, this effort still does not result in complete protection against XSS attacks. Some potential loopholes remain, which cannot be closed by the current version of CSP.

In further detail, XSS summarizes a set of attacks on web applications that enable an adversary to alter the syntactic structure of the application's web content using code or mark-up injection. Even though XSS, in many cases, also enables the attacker to inject HTML or cascading style sheets (CSS) into the vulnerable application, the main concern with this class of attacks is the injection of scripts, such as JavaScript. Script injection actively circumvents all protective isolation measures, which are provided by the same-origin policy, for example, and empowers the adversary to conduct a wide range of potential attacks, e.g., session hijacking, stealing sensitive data and/or passwords, creating self-propagating JavaScript worms. To combat XSS vulnerabilities, it is often recommended to implement a careful and robust combination of input validation (only allow data into the application, if the data matches a provided specification) and output sanitation (encode all potential syntactic content of untrusted data before inserting it into a hypertext transfer protocol (HTTP) response). However, it has been shown that this protective approach is still error prone and that the quantitative occurrence of XSS problems is not declining significantly.

Mechanisms such as CSP have been developed to mitigate the XSS threat. More particularly, a Web application can set a policy that specifies the characteristics of script code that is allowed to be executed. CSP policies are added to a web document, e.g., underlying a web page, through an HTTP header or a meta-tag, as depicted below in example Listing 1:

| Listing 1: Example CSP |
| --- |
| Content-Security-Policy: default-src 'self'; img-src*; object-src media.example.com; script-src trusted.example.com; |

In some examples, a CSP policy can disallow the mixing of HTML mark-up and script syntax in a single document, i.e., forbidding inline script, such as event handlers, in element attributes, can prevent the runtime transformation of string-data into executable script using functions such as eval ( ), and can provide a list of web hosts, from which script code can be retrieved. In some examples, if used in combination, these capabilities lead to an effective thwarting of many XSS attacks. For example, forbidding inline scripts renders direct injection of script code into HTML documents impossible. As another example, the prevention of interpreting string data as code removes the danger of document object model (DOM)-based XSS. As another example, only allowing code from whitelisted hosts to run deprives the adversary from the capability to load attack code from Web locations that are under their control.

In summary, strict CSP policies enforce a simple yet highly effective protection approach with clean separation of HTML-markup and script code in connection with forbidding string-to-code transformations. However, the use of CSP comes with a price. For example, many of the current practices in using JavaScript, especially in respect to inline script and using functions such as eval ( ), have to be altered to accommodate CSP. Making an existing site CSP compliant requires significant changes in the codebase, e.g., removing inline JavaScript, such as event handlers in HTML attributes, and string-to-code transformations.

Further, and as discussed in further detail herein, potential attack variants remain feasible under the currently standardized version 1.0 of CSP. For example, insecure server-side assembly of script code, full control over external, whitelisted scripts, and injection of further script-tags are weaknesses of CSP.

With regard to insecure server-side assembly of script code, as described above, CSP can effectively prevent the execution of script, which has been dynamically assembled on the client-side, e.g., by forbidding all functions that convert string data to script code. However, if a website operator implements dynamic script assembly on the server-side, this directive is powerless. In some examples, server-side generated script is utilized to fill values in scripts with data that is retrieved at runtime. If such data can be controlled by the attacker, the attacker might be able to inject further script.

Take, for example, the scenario that is outlined in example Listing 2 and example Listing 3 provided below:

Listing 2: Example Script for Dynamic Script Loading (loader.js)

```
(function ( ) {
  var ga = document.createElement ('script');
  ga.src = 'http://serv.com/ga.php?source='+document.location;
  var s = document.getElementsByTagName ('script')[0];
  s.parentNode.insertBefore(ga, s);
})( );
```

Listing 3: Example Variable Setting Script (ga.php)

```
// JS code to set a global variable with the
// request's call context
<?php
$s = '$_GET ["source"] ';
echo "var callSource ="".$s." ';";
?>
// [... rest of the JavaScript]
```

In these examples, a script-loader JavaScript (loader.js, Listing 2), is used to dynamically provide further JavaScript resources with runtime data using uniform resource locator (URL) parameters. The referenced script (ga.php, Listing 3) is assembled dynamically on the server-side, including the dynamic data in the source code without any sanitization. If the attacker is able to control the document.location property, the attacker can break out of the variable assignment and inject arbitrary JavaScript code. In this manner, the attacker can effectively circumvent the protection features of CSP, because the attack uses no string-to-code conversion on the client-side. In this example, all the web browser retrieves is apparently static JavaScript. In addition, the attack does not rely on inline scripts, because the injected script is included externally. Further, the vulnerable script is part of the actual application and, hence, the script's hosting domain is included in the policy's whitelist.

With regard to full control over external, whitelisted scripts, it is common practice to include external script components from third-party hosts into web applications. For example, this is done to consume third-party services, e.g., web analytics, enhance the web application with additional functionality, e.g., integrating external mapping services, or for monetary reasons, e.g., to include advertisements. In some examples, if the attacker is able to control the content of the script that is provided by the external provider, the attacker is able to execute script in the context of the targeted web application. An example scenario for such an attack is a full compromise of one of the external script providers for the targeted website. In such a case, the attacker is able to inject and execute arbitrary script in the context of targeted web application. Other, more subtle attacks that enable the same class of script inclusion attacks are also possible.

Unfortunately, CSP is not able to protect against attacks, in which external script components are used. More specifically, a CSP-protected website has to whitelist the external script provider's domain in the CSP policy. However, because the attacker is able to control the contents of the whitelisted host, the attacker is able to circumvent CSP's protection mechanism.

With regard to injection of further script-tags, given an HTML-injection vulnerability, a strict CSP policy will effectively prevent the direct injection of attacker-provided script code. However, the attacker is still able to inject HTML markup including further script-tags pointing to the whitelisted domains. In this manner, the attacker is able to control the URLs and order from which the scripts in a web page are retrieved, and can combine existing scripts in an unforeseen fashion. All scripts in a web page run in the same execution context. JavaScript, for example, provides no native isolation or scoping, e.g., using library specific namespaces. Consequently, all side-effects that a script causes on the global state directly affect all scripts that are executed subsequently. Given the growing quantity and complexity of script code hosted by websites, a non-trivial website might provide an attacker with a well-equipped toolbox for this purpose. Also, the attacker is not restricted to the web application's original website. Scripts from all domains that are whitelisted in the CSP-policy can be combined freely.

The awaited next version of the standard for CSP introduces a new directive called script-nonce, which directly relates to a subset of the identified weaknesses of CSP version 1.0. In cases where a website's CSP utilizes the script-nonce directive, the policy specifies a random value that is required to be contained in all script-tags of the website. Only JavaScript in the context of a script-tag that carries the nonce value as an attribute value is permitted to be executed. Example Listing 4 and example Listing 5 provide an example below:

Listing 4: Example CSP Requiring Script-Nonce

```
Content-Security-Policy:   script-src 'self';
                           script-nonce A3F1G1H41299834E ;
```

Listing 5: Example Use of Script-Nonce

```
<script nonce="A3F1G1H41299834E">
  alert ("I can execute! Hooray!");
</script>
<script> alert ("I cannot execute. Boohoo!"); </script>
```

For apparent reasons, a website is required to renew the value of the nonce for every request. In some examples, the nonce is not a signature or hash of the script, nor does the nonce have any other relation to the actual script content. This characteristic enables the use of the directive to re-enable inline scripts (as depicted in Listing 5) without significant security degradation.

The script-nonce directive effectively prevents the attacker from injecting additional script-tags into a web page, because the attacker is unable to insert the correct nonce value into the tag. With regard to unsafe script assembly, discussed above, the script-nonce directive may not be fully effective. For example, and as discussed above, to exploit this weakness of CSP, an attacker is not necessarily required to inject additional script-tags into the web page. The unsafe script assembly can also happen in legitimate scripts due to attacker controlled data, which was transported through session data or query parameters set by the vulnerable application itself. With regard to adversary controlled scripts, discussed above, the script-nonce directive has no effect. More particularly, the script import from the external host is intended from the vulnerable application. Consequently, the corresponding script-tag will carry the nonce and will be permitted to be executed. With regard to adversary controlled script tags, discussed above, this weakness of CSP can be successfully mitigated through the script-nonce directive. More particularly, because the attacker is not able to guess the correct nonce value, the attacker cannot execute the attack through injecting additional script-tags.

In summary, only one of the CSP weaknesses discussed herein can be fully mitigated through the use of script-nonces, which is expected in the next version of CSP. The reason for the persistence of the other weaknesses lies in the missing relationship between the nonce and the script content. A further potential downside of the script-nonce directive is that it requires dynamic creation of the CSP policy for each request. Consequently, a rollout of a well audited, static policy is not possible.

The above-discussed CSP weaknesses are caused by two characteristics of the policy mechanism. First, a website can only specify the origins that are allowed to provide script content, but cannot specify the actually allowed scripts. Second, even if a website would be able to provide more fine-grained policies on a per-script-URL level, at the moment there are no client-side capabilities to reason about the validity of the actual script content. The first characteristic is most likely a design decision that aims to make CSP more easily accessible and maintainable to website operators. It could be resolved by making the CSP policy format more expressive. However, the second problem is non-trivial to address, especially in the presence of dynamically assembled scripts.

In view of the context provided above, a mechanism that enables website operators to clearly define which scripts are allowed to be executed is desirable. Further, this specification mechanism should not only rely on a script's URL, but should also take the script's content into consideration. The mechanism should further account for static scripts and dynamic scripts.

In view of the foregoing, implementations of the present disclosure are directed to an extension to CSP that mitigates the above-discussed vulnerabilities. More particularly, implementations of the present disclosure provide an extension, referenced herein as PreparedScript, which enables the creation of stable cryptographic checksums of script code while still allowing a certain degree of flexibility with respect to run-time script creation.

In further detail, PreparedScript includes a templating mechanism and a script check-summing scheme. In some examples, the templating mechanism enables developers to separate dynamic data values from script code. In this manner, the use of purely static scripts is provided without losing needed flexibility. In some examples, the script check-summing scheme enables a server to non-ambiguously communicate which scripts are allowed to be executed by a web browser, e.g., a web browser executed on the first computing device 102 of FIG. 1.

In some implementations, the templating mechanism provides script variants, each script variant including syntax that is separated from data values using placeholders. The placeholders are populated at runtime in a manner that is unsusceptible to code injection vulnerabilities, as discussed in further detail herein. In this manner, developers can create completely static script source code, for which the calculation of stable cryptographic checksums at deploy-time is feasible. In some examples, while the web application is accessed, only scripts which have a valid checksum are allowed to run. For example, if the checksum checking terminates successfully, the data values, which are retrieved along with the script code, are inserted into the respective placeholders to provide a valid script that can be executed by the web browser.

In some implementations, the templating mechanism includes a script template and the value list. In some examples, the script template includes a format that supports the use of insertion marks in place of data values. In some examples, these placeholders are named using the syntactic convention of framing the placeholders identifier with question marks, e.g., ?name ?. Such placeholders can be utilized in the script code, wherever the script grammar allows the injection of data values. Example Listing 6, provided below, depicts a template that represents the dynamic script of example Listing 3 above:

---
Listing 6: Example PreparedScript Variable Setting Script (ga.js)

```
//JS code to set a global variable with the
//request's call context
var callSource = ?source?;
// [...rest of the JavaScript]
```
---

In some implementations, the value list includes the data values that are to be applied during script execution by the web browser. In some examples, the value list includes identifier/value pairs, in which the identifier links the value to the respective placeholder within the script template. In some examples, the data values can be basic datatypes, e.g., strings, booleans, numbers. In some examples, the data values can be JavaScript Object Notation (JSON) formatted complex JavaScript data objects. In this manner, insertion of non-trivial data values, e.g., arrays or dictionaries, can be provided. In some implementations, the value list follows the JSON format, where the top level structure represents a key/value dictionary. By using the placeholder identifiers as the keys in the dictionary, a straight forward mapping of the values to insertion points is provided. Furthermore, JSON is a well-established format with good tool, language, and library support for creation and verification of JSON syntax. Example Listing 7, provided below, includes an example hypertext pre-processor (PHP) script that creates the value list for example Listing 6 according to the dynamic script assembly in example Listing 3:

---
Listing 7: Example Creation of Value List (ga_values.php)

```
<?php
$source = $_GET["source"];
$vals = array('callSource'=>$source);
echo json_encode($vals);
?>
```
---

In some examples, the script template and the value list are sent to the web browser, e.g., a web browser executed on the first computing device 102 of FIG. 1, in the same HTTP response, e.g., from the server system 106 of FIG. 1. In some examples, a HTTP multipart response can be used, such as provided in the example Listing 8 below:

---
Listing 8: Example PreparedScript HTTP Multipart Response

---
```
HTTP/1.1 200 OK
Date: Thu, 23 Jan 2014 10:03:25 GMT
Server: Foo/1.0
Content-Type: multipart/form-data; boundary=xYzZY
--xYzZY
Content-Type:  application/pjavascript;
               charset=UTF-8
Content-Disposition: form-data; name="preparedscript"
//Script code to set a global variable with the
//request's call context
var callSource = ?callSource?;
--xYzZY
Content-Type: application/json
Content-Disposition: form-data; name="valueList"
{"callSource": "http://serv.com? this=that#attackerData"}
--xYzZY--
```
---

In some implementations, whitelisted scripts are identified based on respective script checksums. In some examples, a script's PreparedScript-checksum is provided as a cryptographic hash calculated over the corresponding PreparedScript script template. In general, the script checksum is sufficient to robustly identify the script, e.g., using a strong cryptographic hash function algorithm such as SHA256. In some examples, the script's value list is not included in determining the checksum. In this manner, a script's values are able to change during runtime without affecting the checksum. In some implementations, scripts are whitelisted by listing respective script checksums in a policy declaration, discussed in further detail below. For example, the CSP can include a list of allowed script checksums, each allowed script checksum being associated with a script that is allowed to be executed.

In some implementations, for each script that is received by the web browser, the web browser calculates an expected script checksum of the corresponding script template and verifies that the expected script checksum is indeed contained in the policy's set of allowed script checksums, e.g., the expected script checksum matches a script checksum provided in the CSP. If the script checksum is verified, i.e., the expected script checksum calculated by the web browser is included in the set of allowed script checksums, the respective script is permitted to execute. If not, the script is discarded. This approach is well aligned with the applicable attacker type. More particularly, a capability of the XSS attacker, e.g., the user 116 of FIG. 1, includes altering the syntactic structure of the application's HTML content. The XSS attacker, however, is not able to alter the application's CSP policy, which is generally transported in the HTTP header. Consequently, if the application's server-side can unambiguously communicate which scripts are whitelisted to the web browser, an attack that alters the syntactic structure of the document has no effect.

In some implementations, PreparedSript is provided as an extension of the CSP syntax. In some examples, both the list of allowed script hosts and the list of allowed script checksums are included in a policy. This can be achieved, for example, using a comma delimited list of script checksums following a whitelisted script host. Example Listing 9 provides an example CSP syntax:

---
Listing 9: Example Extended CSP Syntax -
Whitelisting Two Script Checksums

---
X-Content-Security-Policy: script-src 'self'
(135c1ac6fa6194bab8e6c5d1e7e98cd9,
2de1cd339756e131e873f3114d807e83)

---

As discussed herein, CSP provides backward compatibility. For example, if a legacy web browser, e.g., a web browser that does not yet implement CSP, renders a CSP-enabled web page the CSP header is simply ignored and the web page's functionality is unaffected. However, because the format of PreparedScript differs from the regular JavaScript syntax, e.g., as depicted in Listing 8, the server-side explicitly provides backwards compatible versions of the script code. Accordingly, and in some examples, a HTML document that implements PreparedScript can utilize an extended syntax for the script-tag. For example, the reference to the PreparedScript script is given in a dedicated ps-src attribute. In some examples, if a web application is to provide a standard script for legacy fallback, the script can be referenced in the same tag using the standard src attribute, as depicted in example Listing 10 below:

---
Listing 10: Example Extended PreparedScript Script-Tag Syntax

---
<script src="[path to legacy script]"
    ps-src="[path to preparedScript script]">

---

This approach provides transparent backwards compatibility on the client-side. For example, web browsers that can process PreparedScript only consider the ps-src attribute and execute processes discussed above. The legacy script, on the other hand, is never touched by such web browsers. Legacy web browsers, e.g., web browsers that do not process PreparedScript, ignore the ps-src attribute, as it is unknown to such web browsers, and retrieve the fallback script referenced by the src attribute.

In summary, PreparedScript affects multiple phases in the lifecycle of a web application. Example phases include a development phase, a deployment phase, and an execution phase. During the development phase, if the web application requires scripting, e.g., JavaScript, with dynamic, run-time generated data values, PreparedScript templates are created for the scripts and a matching value list is generated. During the deployment phase, cryptographic checksums are generated for all scripts, e.g., JavaScripts, and PreparedScript templates that are authorized to run in the context of the web application, and the checksums are added to the extended CSP policy of the website, through which the web application is accessed. During the execution phase, and before execution of regular script code, the CSP policy is checked to determine whether the script's host is whitelisted in the policy, and whether, for the particular host, a list of allowed script checksums is provided. If the script's host is whitelisted in the policy and a list of allowed script checksums is provided for the particular host, the cryptographic checksum for the received script code is calculated and is compared to the list of allowed script checksums. If the calculated checksum is included in the list, the script is allowed to execute. In some examples, for scripts provided in the PreparedScript format, the script template is retrieved from the multipart response, and the checksum is calculated over the template. If the checksum test succeeds, the value list is retrieved from the HTTP response, the placeholders in the script are substituted with the actual values, and the script is executed.

In some implementations, a native, web browser-based implementation of PreparedScript can be provided, e.g., for web browsers that can natively handle PreparedScript. As discussed above, a motivation behind PreparedScript is to mitigate vulnerabilities in the current CSP. Consequently, a native, web browser-based implementation of PreparedScript can be provided as an extension of CSP. In some examples, to execute scripts and to enforce CSP, some web browsers already implement HTML/script parsing and checking CSP compliance of encountered scripts. Consequently, an extension to CSP to support PreparedScript is readily implementable. In some examples, whenever a script-tag is encountered during the parsing process, the script's URL is checked to determine whether the URL complies with the website's CSP policy. Furthermore, if the policy contains script checksums for the URL's host, the checksum for the script's source code is calculated and it is verified whether the checksum is included in the list of legitimate scripts. In the case of PreparedScript templates, the template code is parsed by the web browser's script parser, treating the placeholders as regular data tokens. After the parse tree of the script is established, the placeholders are exchanged with the actual data values contained in the value list. In this manner, regardless of their content, the data values are unable to alter the script's syntactic structure, and no code injection attacks are possible.

In some examples, a web browser might not allow direct altering of the HTML parsing and/or script execution behavior. Accordingly, implementations of the present disclosure can be realized using capabilities that are provided by the extension model. These capabilities can include the network request interception application programming interface (API), to examine all incoming external scripts, and the extension's interface to web browser's script debugger, to insert the compiled PreparedScript code into the respective script-tags.

In some examples, the extension monitors all incoming HTTP responses for CSP headers. If such a CSP header is identified, the extension extracts all contained PreparedScript checksums and intercepts all further network requests that are initiated, because of the src attribute in script tags in the corresponding HTML document. Whenever such a request is encountered, the extension conducts example actions including redirecting the actual request to a specific script, causing the corresponding script threat to trap into the script debugger by the debugger statement. This causes the script execution to briefly pause until the script legitimacy checking has concluded. Furthermore, the request's original URL is used to retrieve the external script's source code, or, in the presence of a ps-src attribute, the PreparedScript template and value list.

In some examples, for the retrieved source code or the PreparedScript template, the cryptographic checksum is calculated using SHA256, e.g., the SHA256 implementation of the Stanford JavaScript Crypto Library. If the resulting checksum was not contained in the website's CSP policy, the process is terminated and the script's source code is blanked out. If the checksum was found in the policy, the script is allowed to be executed. In the case of a PreparedScript template, the template is parsed and the items of the value list are inserted in the marked positions. In some examples, to re-insert the resulting script code into the web page, the extension uses the script debugger and the script execution is resumed.

In some implementations, a server-side implementation of PreparedScript can be provided, e.g., for so-called legacy web browsers that cannot natively handle PreparedScript. More particularly, a backwards compatible version of scripts that only exist in the PreparedScript format can be provided with a server-side implementation of PreparedScript. In some examples, the server-side implementation dynamically compiles, e.g., on the fly, the script template together with the value list before sending the resulting script to the web browser. To this end, for example, the server-side PreparedScript executes the same functionality as the web browser, as discussed above in the native case. More specifically, the server-side PreparedScript retrieves the script template, the value-list, and the list of whitelisted checksums from the web server, calculates the template checksums, verifies that the script is indeed in the whitelist, parses the value list and inserts the resulting values into the template in place of the corresponding value identifiers. In some examples, the data values are sanitized, such that the data values do not carry syntactic content that could alter the semantics of the resulting script. Taking advantage of the composition service, the script-tags of the application can directly reference the script in its PreparedScript form directly, e.g., using the ps-src attribute, and can utilize a specific URL-format for the legacy src attribute, which causes the server-side to route request through the composition service. For example, this can be achieved through a reserved URL parameter that is added to the script's URL, such as ?pjs-prerender=true. In some examples, requests carrying this parameter automatically go through the composition service.

As discussed in further detail below, the above-discussed vulnerabilities of CSP are mitigated by PreparedScript. More specifically, vulnerabilities, such as insecure server-side assembly of script code, discussed above and provided by way of example in Listing 2 and Listing 3, cannot occur if PreparedScript is in use. The cryptographic checksum of dynamically assembled scripts varies for each iteration. Consequently, the check-summing validation will fail, because the script's checksum will not be included in the website's CSP policy. The introduction of the PreparedScript templates offers a reliably secure alternative to insecure server-side script assembly using string concatenation. Because the script's syntactic structure is robustly maintained through pre-parsing in the web browser, before the potentially untrusted data values are inserted, XSS attack vectors are rendered impossible, even in cases in which the attacker controls the dynamic values.

With regard to full control over external, whitelisted script sources, PreparedScript's fine-grained checksum whitelisting reliably prevents this attack. Due to the checksum checking, the attacker cannot leverage a compromised external host or related weaknesses. If the attacker, for example, attempts to serve altered script code from the compromised origin this code's checksum will not appear in the policy's list of permitted scripts. Consequently, the web browser will refuse to execute the script provided in the attack attempt.

With regard to attacker provided src attributes in script-tags, the CSP syntax provides finer-grained control over which scripts are allowed to run in the context of a given web page. Consequently, each page can specify which scripts that it requires, leaving the attacker a minimal number of opportunities to combine script side effects. This is especially powerful, when it comes to script inclusion from large scale external service providers, from which only dedicated scripts are needed for the website to function. Take for example analytics services: using PreparedScript, it can be ensured that only the required script will be executed by the web browser.

Figure 2:
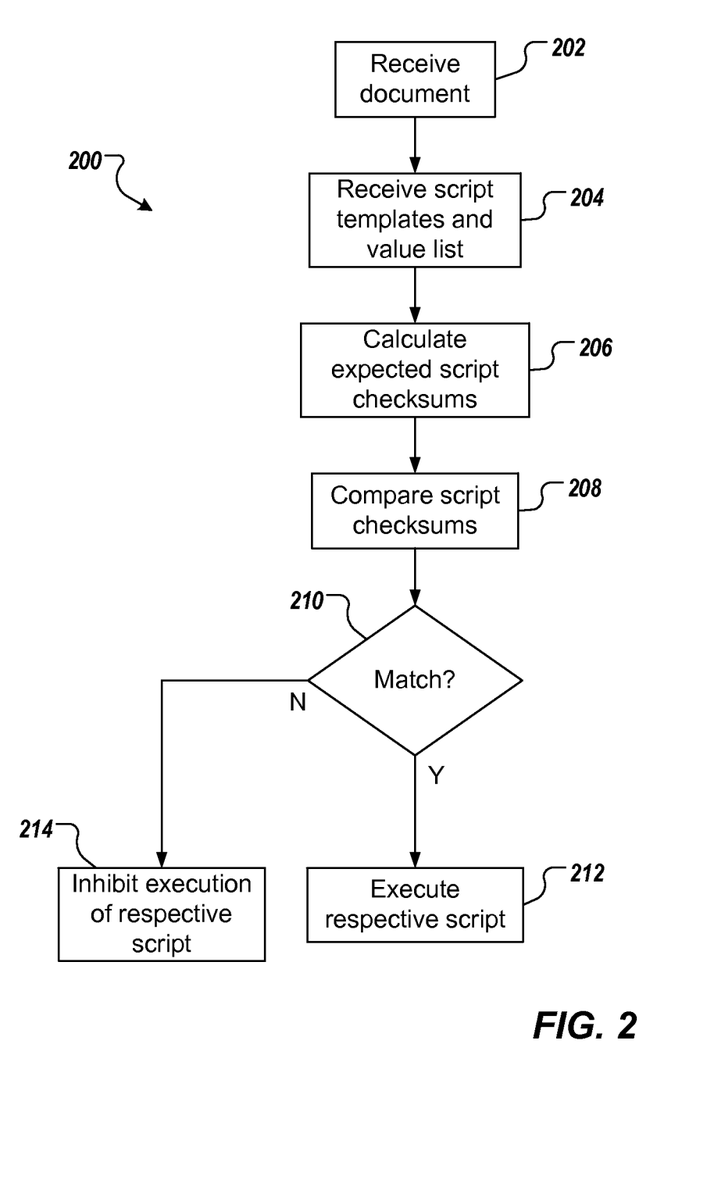
FIG. 2 depicts an example process that can be executed in accordance with implementations of the present disclosure.

FIG. 2 depicts an example process 200 that can be executed in accordance with implementations of the present disclosure. In some examples, the example process 200 can be provided as one or more computer-executable programs executed using one or more computing devices.

A computer-readable document is received (202). In some examples, the computer-readable document provides a CSP for a website and an extension to the CSP. In some examples, the CSP specifies one or more script checksums, each script checksum being associated with a script that is allowed to be executed, e.g., by a web browser. In some examples, the extension requires comparison of script checksums before respective scripts can be executed, as discussed in detail herein. In some examples, the computer-readable document is an HTML document that corresponds to a web page of a website. One or more script templates and a value list are received (204). In some examples, the one or more script templates and the value list are provided in a HTTP response to a web browser.

Expected script checksums are calculated (206). In some examples, it is determined whether each script template of the one or more script templates is associated with a respective host that is whitelisted in the CSP. In some examples, expected script checksums are calculated only for script templates associated with a whitelisted host. The one or more expected script checksums are compared to the one or more script checksums (208).

For each expected script checksum, it is determined whether the expected script checksum matches a script checksum of the one or more allowed script checksums (210). If the expected script checksum matches an allowed script checksum, a respective script that corresponds to the expected script checksum is executed (212). In some examples, execution of the script includes populating the respective script with one or more data values provided in the value list. If the expected script checksum does not match an allowed script checksum, a respective script that corresponds to the expected script checksum is not executed (214).

Figure 3:
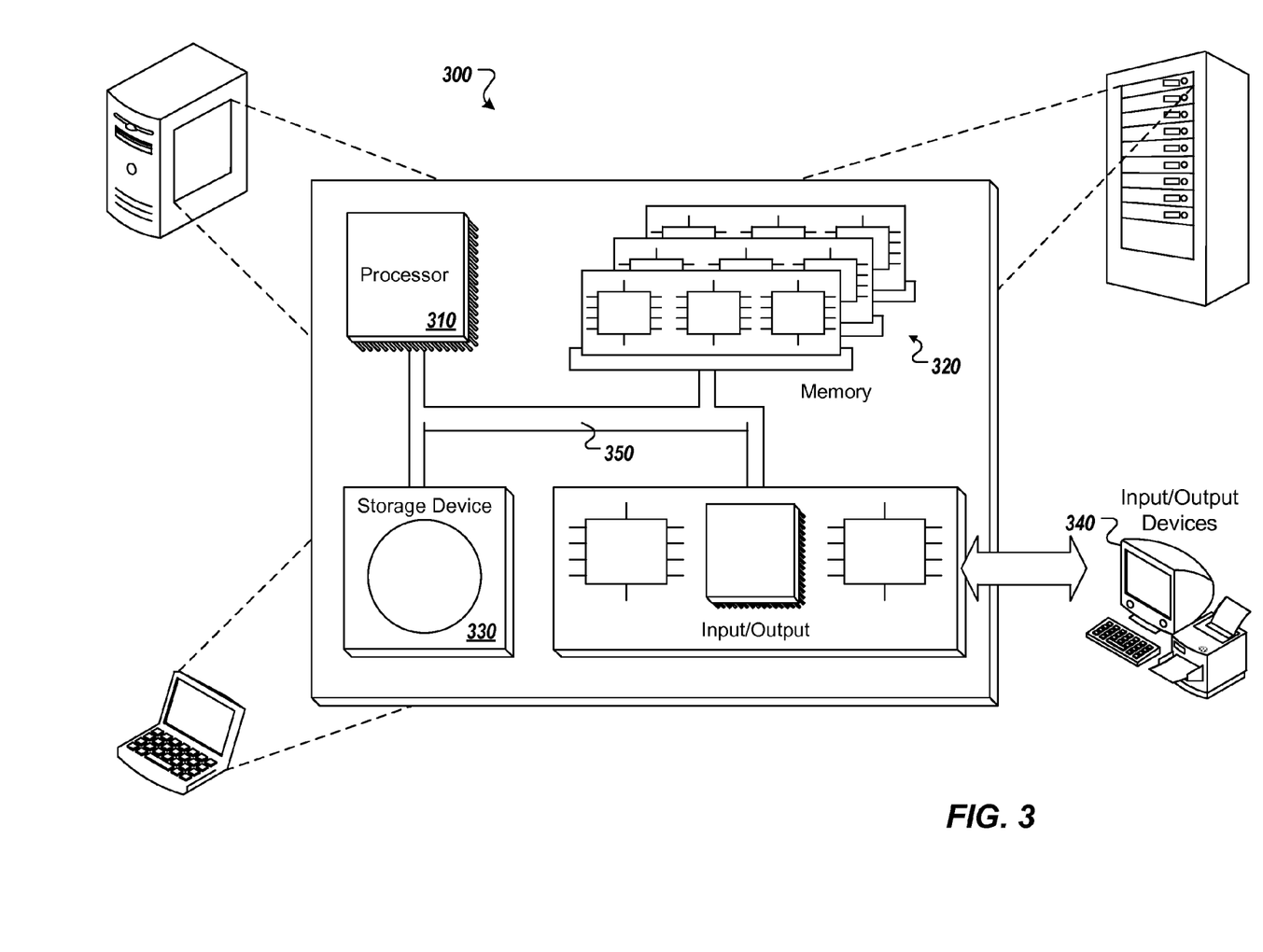
FIG. 3 is a schematic illustration of example computer systems that can be used to execute implementations of the present disclosure.

Referring now to FIG. 3, a schematic diagram of an example computing system 300 is provided. The system 300 can be used for the operations described in association with the implementations described herein. For example, the system 300 may be included in any or all of the server components discussed herein. The system 300 includes a processor 310, a memory 320, a storage device 330, and an input/output device 340. The components 310, 320, 330, 340 are interconnected using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330 to display graphical information for a user interface on the input/output device 340.

The memory 320 stores information within the system 300. In one implementation, the memory 320 is a computer-readable medium. In one implementation, the memory 320 is a volatile memory unit. In another implementation, the memory 320 is a non-volatile memory unit. The storage device 330 is capable of providing mass storage for the system 300. In one implementation, the storage device 330 is a computer-readable medium. In various different implementations, the storage device 330 may be a floppy disk device, a hard disk device, an optical disk device, or a tape device. The input/output device 340 provides input/output operations for the system 300. In one implementation, the input/output device 340 includes a keyboard and/or pointing device. In another implementation, the input/output device 340 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for inhibiting cross-site scripting (XSS) attacks, the method being executed by one or more processors and comprising:
   receiving, by the one or more processors, a computer-readable document, the computer-readable document providing a content security policy (CSP) for a website and an extension to the CSP, the CSP specifying one or more allowed script checksums, each allowed script checksum being associated with a script that is allowed to be executed, the extension comprising a templating mechanism and a script check-summing scheme, the templating mechanism comprising a value list and one or more script templates defining a format of a script syntax that supports a use of insertion marks in place of data values that are to be applied during script execution by a web browser, the script check-summing scheme indicating which respective scripts are allowed to be executed by the website and the extension requiring a comparison of script checksums before the respective scripts can be executed;
   receiving, by the one or more processors, the one or more script templates and the value list;
   calculating, by the one or more processors and based on a cryptographic hash function algorithm associated with the one or more script templates, an expected script checksum for each script template of the one or more script templates to provide respective one or more expected script checksums;
   comparing, by the one or more processors, the one or more expected script checksums to the one or more allowed script checksums; and
   determining, by the one or more processors, that at least one expected script checksum matches an allowed script checksum of the one or more allowed script checksums, and in response, executing a respective script that corresponds to the at least one expected script checksum.

2. The method of claim 1, wherein executing the respective script comprises populating the respective script with one or more data values provided in the value list.

3. The method of claim 1, wherein the value list maps one or more data values to one or more respective placeholders within the one or more script templates.

4. The method of claim 1, wherein at least one script template comprises script syntax and one or more placeholders to separate data values from the script syntax.

5. The method of claim 1, further comprising determining that each script template of the one or more script templates is associated with a respective host that is whitelisted in the CSP.

6. The method of claim 1, wherein calculating the expected script checksum occurs in response to determining that each script template of the one or more script templates is associated with a respective host that is whitelisted in the CSP.

7. The method of claim 1, further comprising determining that a particular expected script checksum does not match an allowed script checksum of the one or more allowed script checksums, and in response, prohibiting execution of a respective script that corresponds to the particular expected script checksum.

8. The method of claim 1, wherein each expected script checksum is calculated as a cryptographic hash.

9. The method of claim 1, wherein processing, comparing and determining are executed on a client-side.

10. The method of claim 9, wherein the one or more script templates and the value list are provided in a hypertext transfer protocol (HTTP) response to the client-side from a server-side.

11. The method of claim 9, wherein processing, comparing and determining are executed by a web browser that is executed on the client-side.

12. The method of claim 1, wherein processing, comparing and determining are executed on a server-side.

13. The method of claim 12, wherein executing is performed on a client-side.

14. The method of claim 1, wherein the computer-readable document is an HTML document.

15. A non-transitory computer-readable storage medium coupled to one or more processors and having instructions stored thereon which, when executed by the one or more processors, cause the one or more processors to perform operations for inhibiting cross-site scripting (XSS) attacks, the operations comprising:
   receiving a computer-readable document, the computer-readable document providing a content security policy (CSP) for a website and an extension to the CSP, the CSP specifying one or more allowed script checksums, each allowed script checksum being associated with a script that is allowed to be executed, the extension comprising a templating mechanism and a script check-summing scheme, the templating mechanism comprising a value list and one or more script templates defining a format of a script syntax that supports a use of insertion marks in place of data values that are to be applied during script execution by a web browser, the script check-summing scheme indicating which respective scripts are allowed to be executed by the website and the extension requiring a comparison of script checksums before the respective scripts can be executed;
   receiving the one or more script templates and the value list;
   calculating, based on a cryptographic hash function algorithm associated with the one or more script templates, an expected script checksum for each script template of the one or more script templates to provide respective one or more expected script checksums;
   comparing the one or more expected script checksums to the one or more allowed script checksums; and
   determining that at least one expected script checksum matches an allowed script checksum of the one or more allowed script checksums, and in response, executing a respective script that corresponds to the at least one expected script checksum.

16. A system, comprising:
   a computing device; and
   a non-transitory computer-readable storage device coupled to the computing device and having instructions stored thereon which, when executed by the computing device, cause the computing device to perform operations for inhibiting cross-site scripting (XSS) attacks, the operations comprising:
      receiving a computer-readable document, the computer-readable document providing a content security policy (CSP) for a website and an extension to the CSP, the CSP specifying one or more allowed script checksums, each allowed script checksum being associated with a script that is allowed to be executed, the extension comprising a templating mechanism and a script check-summing scheme, the templating mechanism comprising a value list and one or more script templates defining a format of a script syntax that supports a use of insertion marks in place of data values that are to be applied during script execution by a web browser, the script check-summing scheme indicating which respective scripts are allowed to be executed by the website and the extension requiring a comparison of script checksums before the respective scripts can be executed;

receiving the one or more script templates and the value list;

calculating, based on a cryptographic hash function algorithm associated with the one or more script templates, an expected script checksum for each script template of the one or more script templates to provide respective one or more expected script checksums;

comparing the one or more expected script checksums to the one or more allowed script checksums; and determining that at least one expected script checksum matches an allowed script checksum of the one or more allowed script checksums, and in response, executing a respective script that corresponds to the at least one expected script checksum.

* * * * *